United States Patent
Hudson, Jr. et al.

[11] Patent Number: 6,155,497
[45] Date of Patent: Dec. 5, 2000

[54] SPRAYER TANK WITH COMBINATION HOSE OUTLET AND PRESSURE RELEASE VALVE

[75] Inventors: Robert Clive Hudson, Jr., Northbrook, Ill.; Alan Lonneman, Plymouth; Lester Robert Small, Oakdale, both of Minn.

[73] Assignee: H.D. Hudson Manufacturing Company, Chicago, Ill.

[21] Appl. No.: 09/097,745

[22] Filed: Jun. 16, 1998

Related U.S. Application Data

[63] Continuation-in-part of application No. 08/957,273, Oct. 24, 1997, Pat. No. 5,924,633.

[51] Int. Cl.[7] .................................................. A62C 15/00
[52] U.S. Cl. ............................................ 239/373; 137/588
[58] Field of Search ........................... 239/373, 152–154, 239/337; 222/400.7, 402.14, 479; 137/588

[56] References Cited

U.S. PATENT DOCUMENTS

| 2,032,024 | 2/1936 | Lucker . |
|---|---|---|
| 2,269,092 | 1/1942 | Leddy . |
| 2,778,374 | 1/1957 | Boyer . |
| 3,537,652 | 11/1970 | Pearl . |
| 4,140,337 | 2/1979 | Arcella et al. . |
| 4,400,020 | 8/1983 | Keller . |
| 4,782,982 | 11/1988 | Ellison . |
| 4,903,864 | 2/1990 | Sirhan . |
| 5,072,884 | 12/1991 | Elison et al. . |
| 5,307,995 | 5/1994 | Jackson et al. . |
| 5,551,470 | 9/1996 | Duvall . |

*Primary Examiner*—Kevin Weldon
*Attorney, Agent, or Firm*—Morgan & Finnegan, L.L.P.

[57] ABSTRACT

A sprayer tank is molded with a threaded boss. A hose adapter is coupled with the boss and possesses several attributes including the ability to swivel independently of the tank fitting hose nut, and ability to remove the swivel part, supply tube and hose without removing the tank fitting hose nut. A pressure relief valve is associated with the adapter for venting the tank.

32 Claims, 4 Drawing Sheets

SPRAYER TANK WITH COMBINATION HOSE OUTLET AND PRESSURE RELEASE VALVE

REFERENCE TO RELATED PATENT APPLICATION

The present application is a continuation-in-part of commonly assigned application Ser. No. 08/957,273 filed Oct. 24, 1997 now U.S. Pat. No. 5,924,633 entitled "Sprayer Tank with Internal Threads and Swivel Hose Outlet".

BACKGROUND OF THE INVENTION

In application Ser. No. 08/957,273, a sprayer tank or other pressure vessel is provided with an internal threaded boss that is designed to enhance the seal with a hose adapter as internal tank pressure increases. This hose adapter (i) is capable of swivel action independent of the tank fitting hose nut, (ii) that possesses pressure release slots and (iii) has the ability to remove the swivel part, supply tube and hose without removing the tank fitting hose nut.

SUMMARY OF THE INVENTION

A principal object is to provide the hose adapter of the foregoing patent application with enhancements including a pressure release valve that optimizes the safety of the entire tank or vessel assembly.

DETAILED DESCRIPTION

Figure 1:
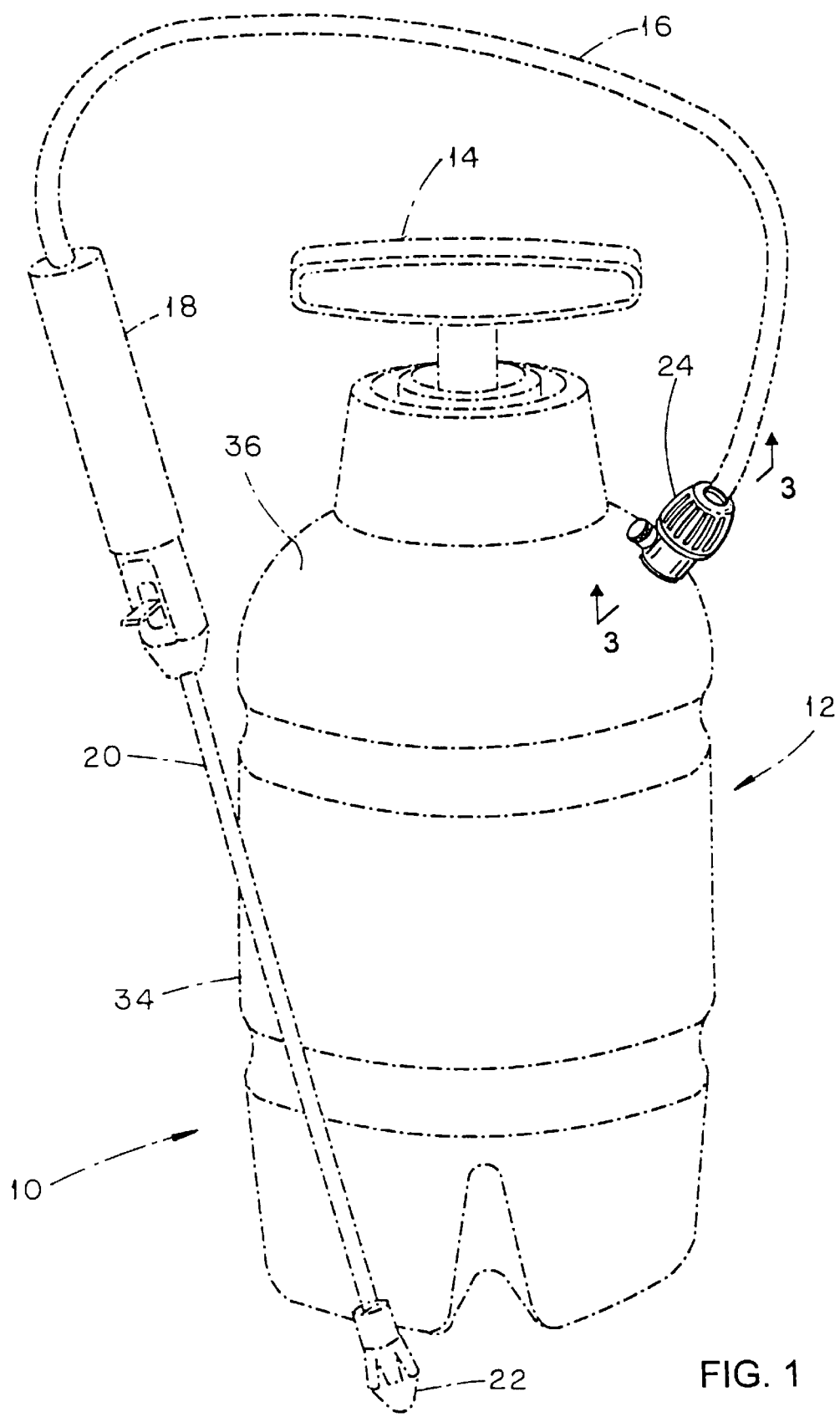
FIG. 1 is a perspective view of a blow molded plastic sprayer tank incorporating the teachings of the present invention including the internally threaded boss and novel swivel hose outlet.
Figure 2:
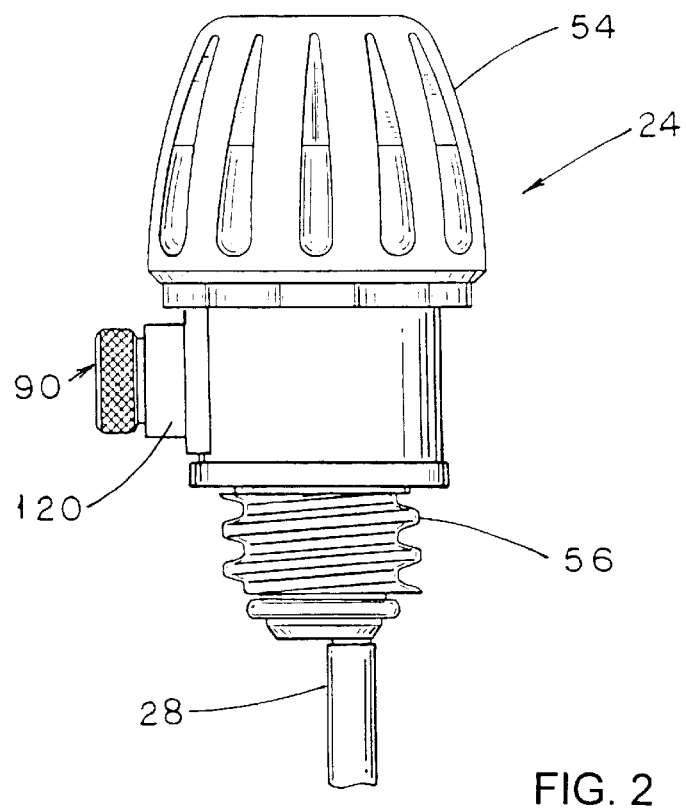
FIG. 2 is an elevational view of the swivel hose outlet.
Figure 4:
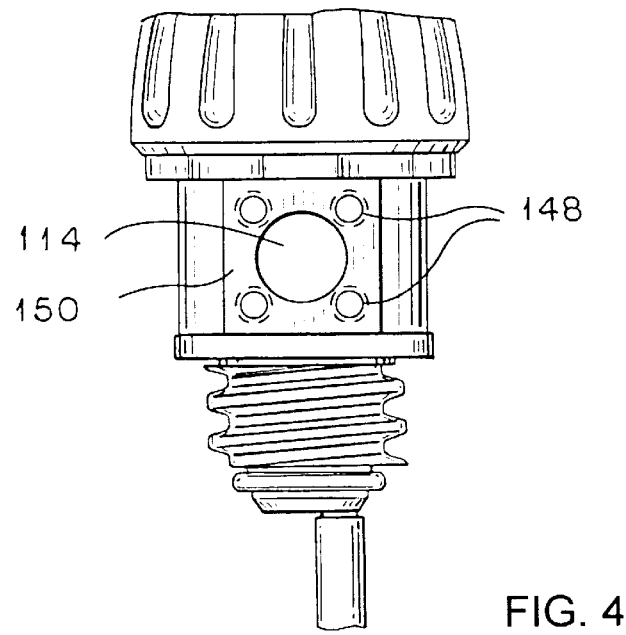
FIG. 4 is a fragmentary elevational view showing the valve receiving recess in the valve body together with the tapped opening for cooperating in securing the pressure release valve.
Figure 3:
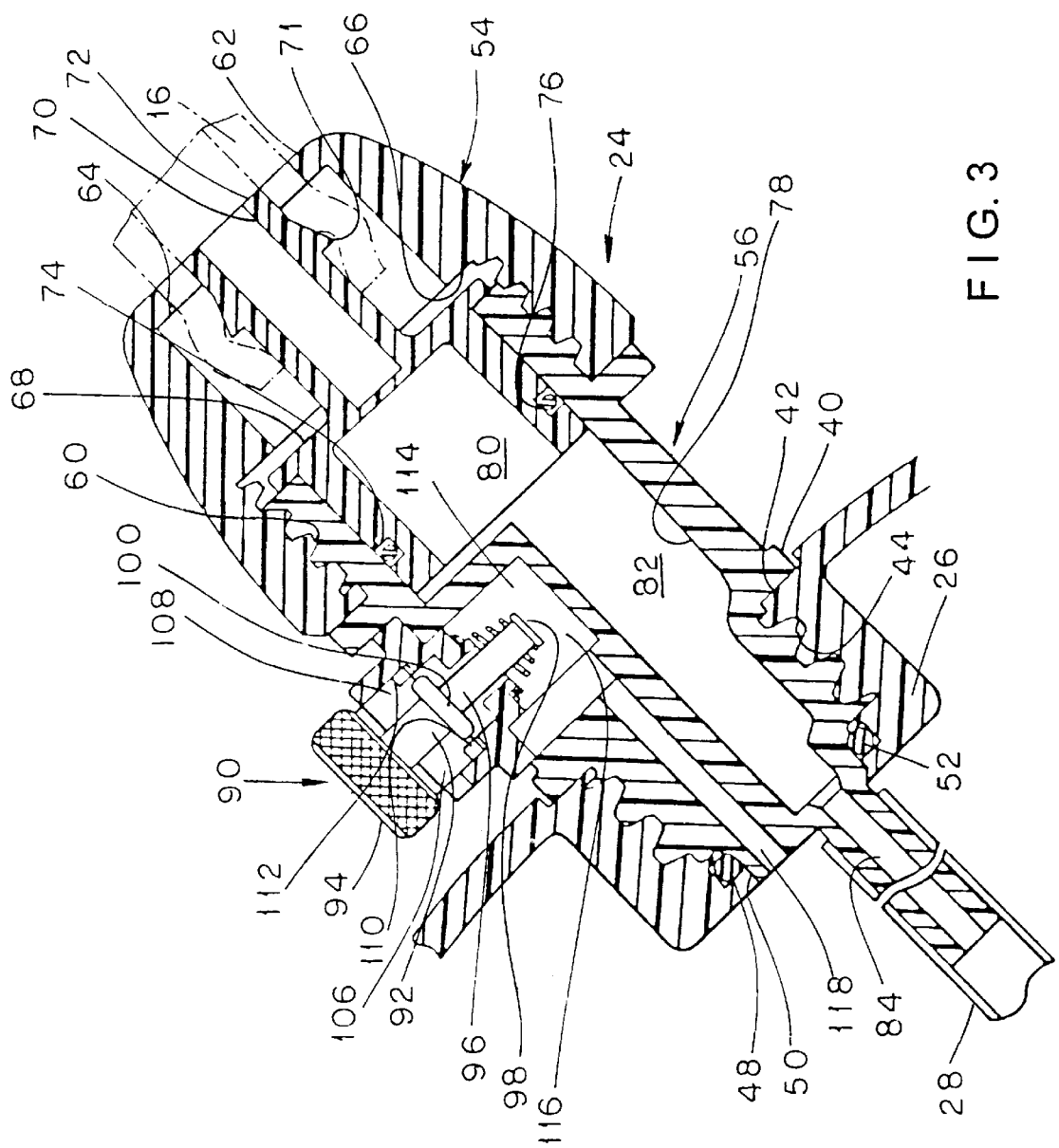
FIG. 3 is a cross sectional view of the swivel hose outlet coupled with the internally threaded boss of the sprayer tank, shown fragmentarily.
Figure 5:
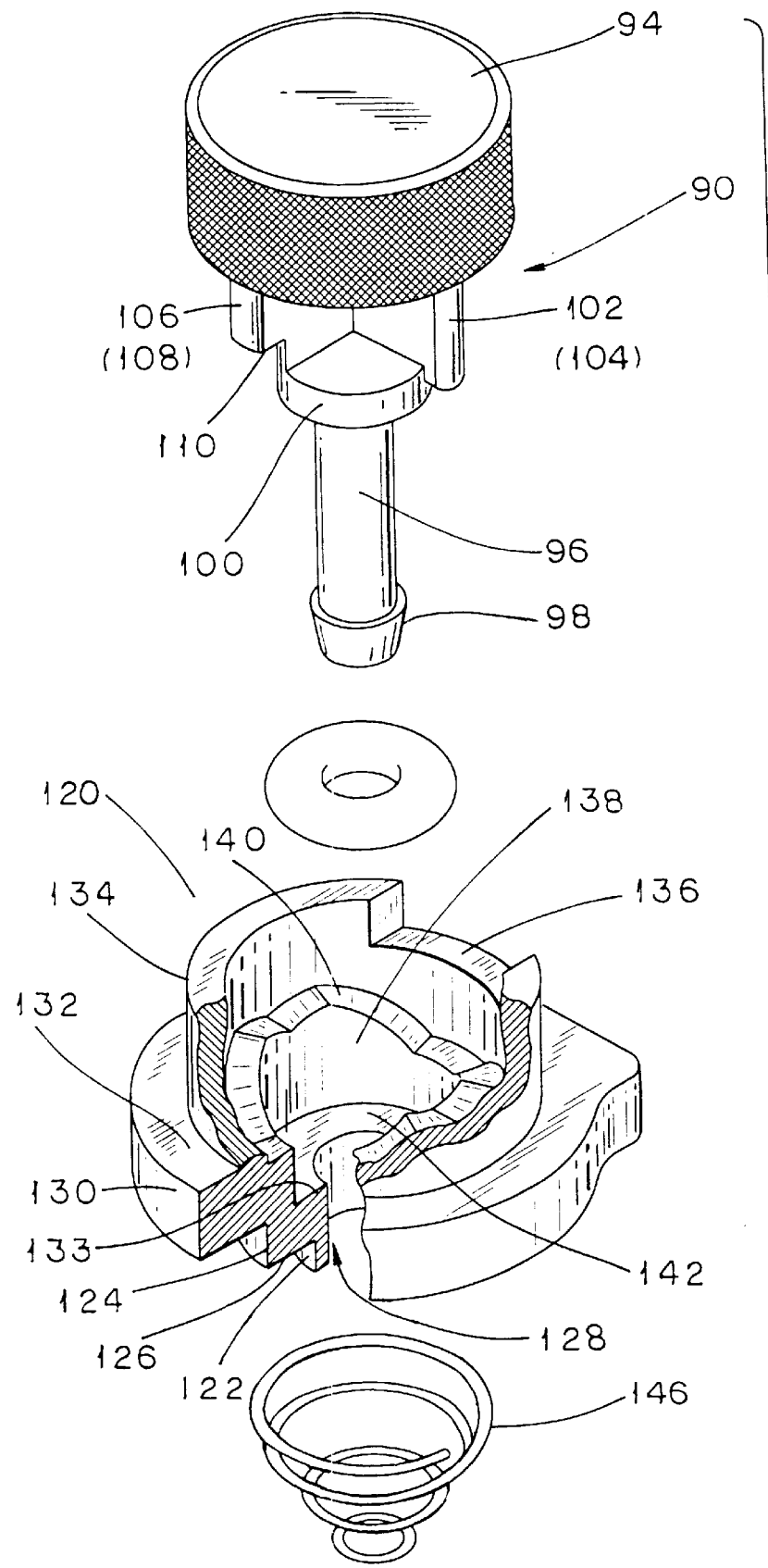
FIG. 5 is an exploded view of the pressure release valve showing the lock-on/lock-off means of the valve.

In the drawings, a sprayer 10 is shown being particularly effective for the control of insects, disease and weeds and for use in the yard, garden and home. The sprayer 10 includes the tank or vessel 12 incorporating the teachings of the present invention, pump 14 for pressurizing the contents of the tank 12, hose 16 extending from the tank and terminating in a spray control valve 18 which is coupled with a rod extension 20 having an adjustable nozzle 22 for obtaining the desired spray pattern. In this connection, the nozzle 22 may be adjusted to provide a mist on the one hand to a stream on the other for projection over relatively long distances. The spray control valve 18 may be readily rotated and turned to aim the extension 20 and consequently the nozzle 22 to the selected target. The valve 18 may be actuated by depressing the illustrated valve control lever in a manner well known in the art. The hose 16 may be formed of vinyl for purposes of resisting corrosion and wear. The hose 16 is also readily removable from the tank 12 for servicing and towards this end a swivel hose adapter 24 of this invention may be utilized for such purposes, that not only connects with an internally threaded boss 26 of the tank 12 but communicates the hose 16 with a supply tube 28 extending interiorly of the tank 12. The pump 14 is preferably fabricated of plastic material and is well known in the art and is designed to resist corrosion and provide relatively fast easy pump-up and pressurization of the tank interior. The pump 14 is conveniently and most advantageously secured to the neck 30 of the tank 12 by means of meshing threads (not shown) of both the tank neck and the pump exterior.

Reference is now made to the tank 12 which is preferably fabricated of one-piece integral plastic material by means of blow molding. Obviously the tank may be made utilizing other techniques and materials. A successful material for purposes of fabricating the tank 12 is polyethylene. The tank 12 is provided with a substantially cylindrical side wall 34 of any prescribed height depending on the desired capacity of the tank 12, which according to successful embodiments of the invention has capacities of 2 and 3 gallons. At the top 36 of the side wall 34 the vessel converges into the narrowed neck 30.

Referring now to the internally threaded boss 26 incorporating the teachings of this invention. The boss is provided with an outer bore 38 which communicates with a reduced bore 40 with interposed shoulder 42 therebetween. Bore 40 communicates with the internally threaded bore 44. The inner end of the bore 44 terminates on a shoulder 48 that defines bore 50. The shoulder advantageously receives O-ring 52 which cooperates with adjacent surfaces of the swivel hose adapter 24 in sealing the juncture therebetween. This seal is greatly enhanced because of the internal boss location as the internal tank pressure increases.

The swivel hose adapter 24 includes an outer housing member 54 and an internal housing which meshes with external threads 60 on the proximal end of the inner housing member 56. The outer housing member 54 is hollow and is formed with an outer flange 62 defining bore 64 which is adapted to receive hose 16. Intermediate the ends of the outer housing member 54 is internal shoulder 66 which cooperates with the proximal end of the inner housing member 56 to loosely receive therebetween flange 68 of hose connector 70. This permits the hose connector to swivel within adapter 24.

The hose connector 70 is formed with a barb 71 at its proximal end 72 for cooperating with surfaces of flange 62 to anchor the end of hose 16. The distal end of the hose connector 70 is formed with an annular recess 74 that receives an O-ring 76 that cooperates in sealing the junction between the distal end of the hose connector 70 and the inner concentric cylinder 78 on the proximal end of the inner housing member 56. The hose connector 70 is formed with an internal bore 80 that communicates with the bore of hose 16 and the internal bore 82 defined by cylinder 78. Bore 82 communicates with bore 84 in the distal end of the inner housing member which receives the dip tube 28 which extends into the bottom of the tank interior.

Turning now to the pressure release valve 90 which is included to advantageously vent or release pressure from the interior of the tank specifically from the tank headspace. This may be accomplished manually or automatically when the pressure of the head space exceeds a certain level. The pressure release valve 90 includes a stem 92 having an outer knurled or roughened finger grippable handle or knob 94 at its proximal end, an intermediate shaft 96 and shoulder 98 at its distal or inner end. Between the handle 94 and shaft 96 is an intermediate circular rib 100 and a pair of diametrically opposed plates 102, 104 and a pair of normal diametrically opposed plates 106, 108 each having a step 110, 112, respectively.

The inner housing member 56 is provided with a circular recess 114 which is defined internally by a closed triangularly shaped wall 116. A bore 118, parallel to bore 84 communicates with recess 114 as well as the tank headspace to vent the headspace when the valve 90 is opened. In order to facilitate the mounting of the valve 90 onto the inner housing member 56 a retainer or coupling 120 is provided with a distal or inner cylindrical part 122 that merges with a larger cylindrical part 124 having an intermediate shoulder 126. An inner bore 128 extends through parts 122 and 124. Cylindrical part 124 extends into a circular flange 130 defining therebetween an external shoulder 132 and internal shoulder 133. A proximal cylindrical part 134 extends rearwardly from flange 130 and is formed with a partial cut-out 136. Passage 138 extends through the retainer 120 and communicates with bore 128. A multiple cam surface 140 extends rearwardly from inner shoulder 142 of flange 130. This multiple cam surface 140 cooperates with the plates 102, 104 and 106, 108 of stem 92 in defining the valve open and closed position as will be described in further detail.

An O-ring 144 is interposed between circular rib 100 and internal shoulder 133 of retainer 120 to seal the juncture therebetween for maintaining the valve 90 closed. In this regard, spring 146 is interposed between stem shoulder 98 and retainer shoulder 126 to bias the stem 92 inwardly and, consequently, the valve to its closed position.

In order to secure the valve 90 to the inner housing member 56, a number of tapped openings 148 are provided in the flat surface 150. Screws or thread bolts extend through holes in flange 130 into the tapped openings and tightened to thereby secure the valve 90 in place.

In operation, the valve 90 will be normally closed with the stem turned and oriented so that the steps 110, 112 of plates 106, 108 are engaged with cam surface 140. In this position the stem rib 100 is firmly seated on O-ring 144 to seal the junction with inner retainer shoulder 133. When it is desired to relieve, release or vent the interior of the tank 12 and, specifically the tank headspace, the handle 94 is grasped, pulled and turned so that the plates 102, 104 engage with the cam surface 140 to thereby permit air to pass around the O-ring 144. When the headspace has been sufficiently vented, the handle 94 is turned so that the steps 110, 112 engage cam surface 140. More significantly, when the adapter 24 is to be removed or uncoupled from tank 12, the headspace should be completely vented in the foregoing fashion.

Thus the present invention provides improved and enhanced sealing between the adapter 24 and the boss 26 because of the location of the latter internally within the tank interior. Moreover, the adapter 24 permits more efficient and convenient operation of the spray control valve 18 and rod extension 20 because the hose connector 70 is permitted to swivel or move; and the adapter provides for enhanced safety by the inclusion of the pressure release valve 90. It should also be abundantly clear that the improved adapter is also applicable to coupling with an externally projecting boss on the tank that has either internal or external threads. In regard to the latter, the inner end of the valve body will have an externally or internally threaded skirt, respectively, for such purposes.

Thus, the several aforenoted objects and advantages are most effectively attained. Although a single somewhat preferred embodiment of the invention has been disclosed and described in detail herein, it should be understood that its scope is to be determined by that of the appended claims.

What is claimed is:

1. A pressure vessel comprising in combination:
   a side wall, a top, and a closed bottom and an internal surface in an interior;
   a hose coupling means on the side wall near the top for coupling with a hose adapter for passage of the contents of the vessel under pressure, the hose coupling means including a boss extending from the vessel;
   the boss having means for coupling with a hose adapter and means for cooperating in providing a seal with the hose adapter;
   the hose adapter including an outer housing member, an inner housing member having a through bore and adapted to couple with the boss of the pressure vessel, a hose connector having a through bore, the outer and inner housing members cooperating in providing means for permitting the hose connector to swivel with respect to the housing members, the through bores being in fluid communication with one another and the vessel interior;
   a pressure relief valve coupled with the adapter, means for providing fluid communication through the valve between the interior of the vessel and ambient.

2. The invention in accordance with claim 1 wherein the means for coupling with the hose adapter includes a bore having internal threads for coupling with mating threads of the hose adapter.

3. The invention in accordance with claim 2 wherein the boss extends into the interior of the vessel and has an innermost distal end including a flange for cooperating in providing a seal with the hose adapter.

4. The invention in accordance with claim 3 wherein an O-ring engages the flange for cooperating in providing a seal with the hose adapter.

5. The invention in accordance with claim 1 wherein the hose connector includes a proximal end for coupling with an end of a hose.

6. The invention in accordance with claim 5 wherein the hose connector includes a radially extending flange, with surface means on the outer and inner housing members for receiving the flange of the hose connector in providing the swivel means.

7. The invention in accordance with claim 6 wherein the hose connector and inner housing member having means for cooperating in providing a seal therebetween.

8. The invention in accordance with claim 1 wherein the pressure vessel is an all plastic, one piece blow molded vessel.

9. The invention in accordance with claim 1 wherein the pressure vessel is a sprayer.

10. The invention in accordance with claim 1 wherein the inner housing member includes a recess for receiving the pressure relief valve and a bore in fluid communication therewith and adapted to be in fluid communication with the interior of the pressure vessel.

11. The invention in accordance with claim 1 wherein the pressure relief valve includes a retainer coupled with the inner housing member and defining a valve seat and passage therethrough, a stem defining a junction with the valve seat, a sealing means interposed between the stem and valve seat for sealing the junction between the stem and the valve seat.

12. The invention in accordance with claim 11 wherein a biasing means is interposed between the stem and retainer for urging the valve to its closed position.

13. The invention in accordance with claim 12 wherein the biasing means is a spring.

14. The invention in accordance with claim 12 wherein the stem is provided with a finger graspable handle for moving the valve stem against the bias of the biasing means to open the valve and vent the interior of the vessel.

15. The invention in accordance with claim 11 wherein cam means are provided by surfaces of the stem and retainer for facilitating moving the valve to a closed position and moving the valve to an open position.

16. The invention in accordance with claim 15 wherein the cam means includes a cam surface on the retainer and a cam follower on the stem for engaging with the cam surface.

17. The invention in accordance with claim 1 wherein the inner housing member includes a recess for receiving the pressure relief valve and a bore in fluid communication therewith and adapted to be in fluid communication with the interior of the pressure vessel, the pressure relief valve includes a retainer coupled with the inner housing member and defining a valve seat and passage therethrough, a stem defining a junction with the valve seat, a sealing means interposed between the stem and valve seat for sealing the junction between the stem and the valve seat, a biasing means is interposed between the stem and retainer for urging the valve to its closed position, the stem is provided with a finger graspable handle for moving the valve stem against the bias of the biasing means to open the valve and vent the interior of the vessel, cam means are provided by surfaces of the stem and retainer for facilitating moving the valve to a closed position and moving the valve to an open position.

18. A swivel hose adapter comprising an outer housing member, an inner housing member having a through bore adapted to couple with a boss of a pressure vessel having an interior, a hose connector having a through bore, the outer and inner housing members cooperating in providing means for permitting the hose connector to swivel with respect to the housing members, the through bores being in fluid communication with one another, and a pressure relief valve coupled with the adapter, means for providing fluid communication through the valve between the vessel interior and ambient.

19. The invention in accordance with claim 18 wherein the hose connector includes a proximal end for coupling with an end of a hose.

20. The invention in accordance with claim 19 wherein the hose connector includes a radially extending flange, with surface means on the outer and inner housing members for receiving the flange of the hose connector in providing the swivel means.

21. The invention in accordance with claim 20 wherein the hose connector and inner housing member having means for cooperating in providing a seal therebetween.

22. The invention in accordance with claim 18 wherein the inner housing member includes a recess for receiving the pressure relief valve and a bore in fluid communication therewith and adapted to be in fluid communication with the interior of the pressure vessel.

23. The invention in accordance with claim 18 wherein the pressure relief valve includes a retainer coupled with the inner housing member and defining a valve seat and passage therethrough, a stem defining a junction with the valve seat, a sealing means interposed between the stem and valve seat for sealing the junction between the stem and the valve seat.

24. The invention in accordance with claim 23 wherein a biasing means is interposed between the stem and retainer for urging the valve to its closed position.

25. The invention in accordance with claim 24 wherein the biasing means is a spring.

26. The invention in accordance with claim 24 wherein the stem is provided with a finger graspable handle for moving the valve stem against the bias of the biasing means to open the valve and vent the interior of the vessel.

27. The invention in accordance with claim 23 wherein cam means are provided by surfaces of the stem and retainer for facilitating moving the valve to a closed position and moving the valve to an open position.

28. The invention in accordance with claim 27 wherein the cam means includes a cam surface on the retainer and a cam follower on the stem for engaging with the cam surface.

29. The invention in accordance with claim 18 wherein the inner housing member includes a recess for receiving the pressure relief valve and a bore in fluid communication therewith and adapted to be in fluid communication with the interior of the pressure vessel, the pressure relief valve includes a retainer coupled with the inner housing member and defining a valve seat and passage therethrough, a stem defining a junction with the valve seat, a sealing means interposed between the stem and valve seat for sealing the junction between the stem and the valve seat, biasing means is interposed between the stem and retainer for urging the valve to its closed position, the stem is provided with a finger graspable handle for moving the valve stem against the bias of the biasing means to open the valve and vent the interior of the vessel, cam means are provided by surfaces of the stem and retainer for facilitating moving the valve to a closed position and moving the valve to an open position.

30. A combination hose adapter and pressure relief valve for a pressure vessel having an interior for providing fluid communication through the valve between the vessel interior and ambient comprising in combination:

a retainer coupled with an inner housing member of a hose adapter and defining a valve seat and passage therethrough, a stem defining a junction with the valve seat, a sealing means interposed between the stem and valve seat for sealing the junction between the stem and the valve seat;

wherein said inner housing member cooperates with an outer housing member to permit a hose connector to swivel with respect to the housing members; and wherein a biasing means is interposed between the stem and retainer for urging the valve to its closed position.

31. The invention in accordance with claim 30 wherein the biasing means is a spring.

32. The invention in accordance with claim 30 wherein the stem is provided with a finger graspable handle for moving the valve stem against the bias of the biasing means to open the valve and vent the interior of the vessel.

* * * * *